United States Patent

Kunz

[11] 4,406,029
[45] Sep. 27, 1983

[54] MACHINE FOR REMOVING BURRS FROM SHEET METAL OR THE LIKE

[75] Inventor: Udo Kunz, Lörrach-Hauingen, Fed. Rep. of Germany

[73] Assignee: Kunz Maschinen - und Apparatebau GmbH, Lörrach-Hauingen, Fed. Rep. of Germany

[21] Appl. No.: 294,160

[22] Filed: Aug. 19, 1981

[51] Int. Cl.³ ............................................ A46B 13/02
[52] U.S. Cl. ...................................... 15/77; 15/21 D; 51/74 R
[58] Field of Search .................. 15/3.17, 308, 21 D, 15/40, 53 AB, 77, 88, 102; 134/6; 51/72 R, 74 R

[56] References Cited

U.S. PATENT DOCUMENTS

| | | | |
|---|---|---|---|
| 1,964,174 | 6/1934 | Raiche | 15/21 D |
| 3,258,804 | 7/1966 | Fowle | 15/88 |
| 3,274,630 | 9/1966 | Mileikowsky et al. | 15/21 D |
| 3,400,449 | 9/1968 | Maguire et al. | 15/77 X |

FOREIGN PATENT DOCUMENTS 1488974 10/1977 United Kingdom .

*Primary Examiner*—Edward L. Roberts
*Attorney, Agent, or Firm*—Kontler, Grimes & Battersby

[57] ABSTRACT

A deburring machine for plate- or sheet-like workpieces has a horizontal table on which a workpiece to be treated is supported during movement in parallelism with at least one of its elongated marginal portions. At least one set of coaxial cylindrical brushes is adjacent to the one marginal portion of the moving workpiece and the brushes form at least one pair of neighboring brushes which are driven to rotate in opposite directions whereby the metallic bristles of one brush treat the underside and the metallic bristles of the other brush treat the upper side of the one marginal portion. The frame of the machine can support two sets of coaxial brushes if the workpieces have parallel marginal portions. Such workpieces are advanced between the two sets of brushes so that one set treats one of the parallel marginal portions and the other set treats the other marginal portion. The brushes of each pair can be driven in opposite directions by a single motor and one or more transmissions which eceive torque from the motor or from one of the brushes if the one brush receives torque directly from the motor or from a shaft which is common to the brushes of a set and is or can be driven by the motor. Each set can be assembled of two or more pairs of neighboring brushes, and each marginal portion of a workpiece can be simultaneously treated by two sets of brushes which define a nip for entry of the marginal portion which requires deburring or an analogous treatment.

65 Claims, 12 Drawing Figures

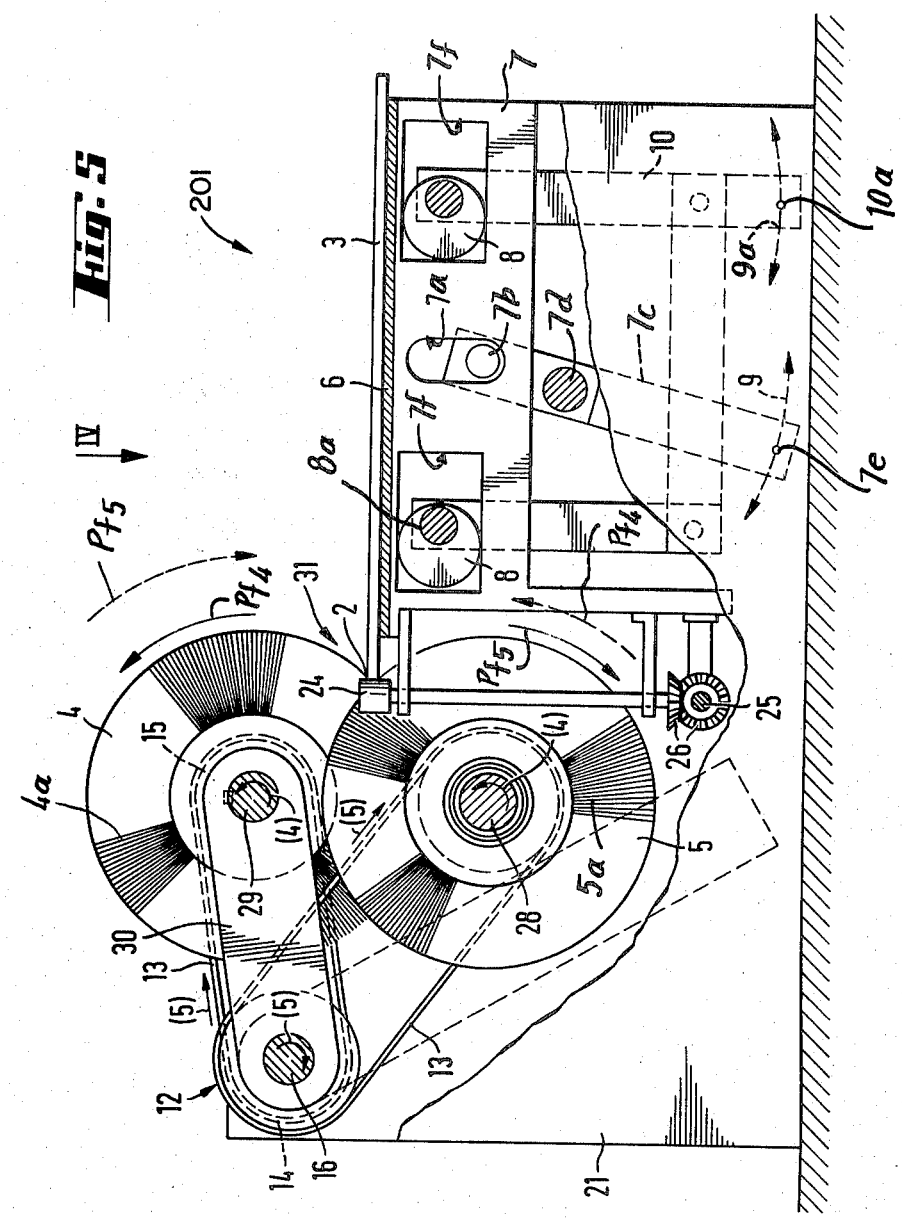

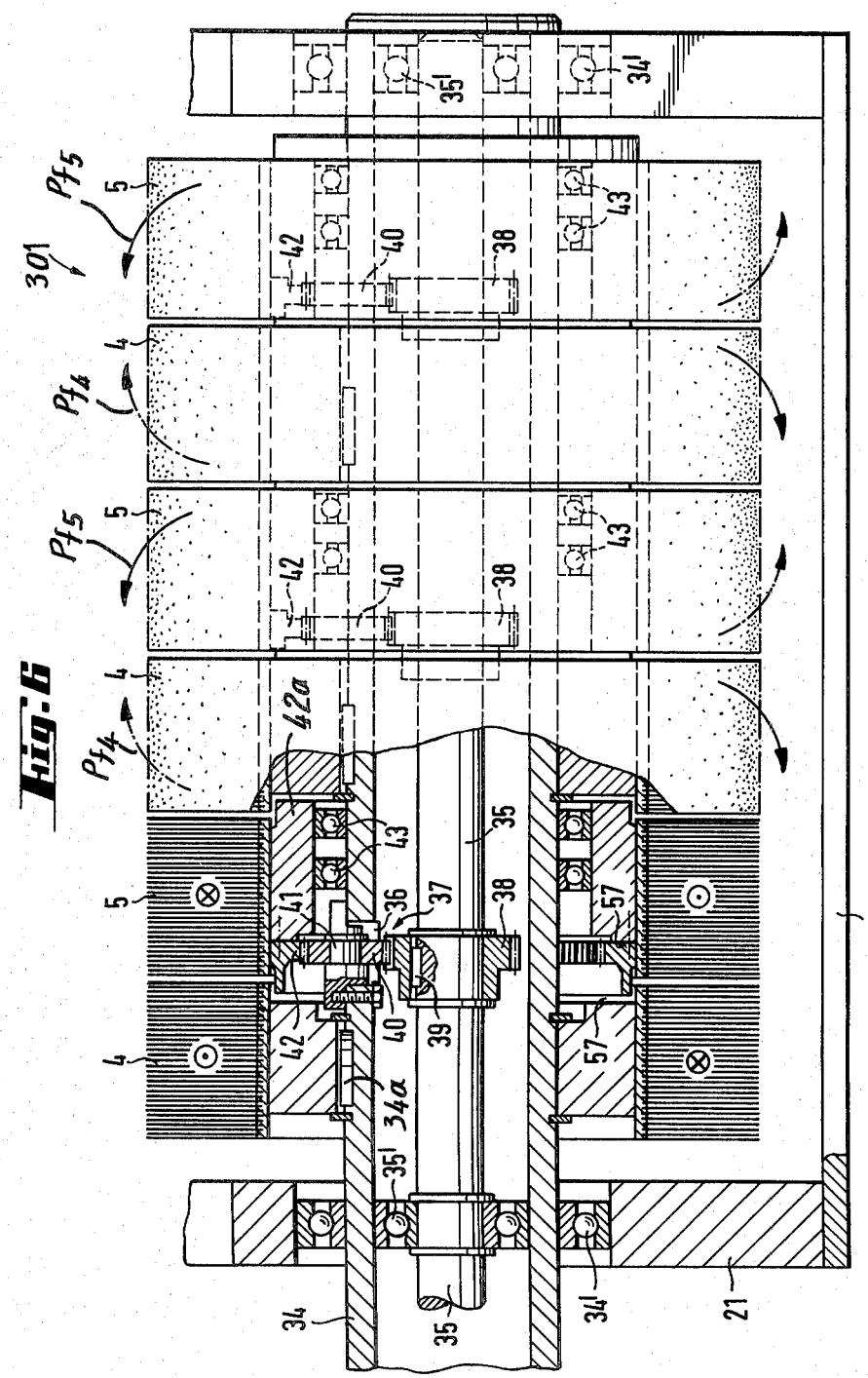

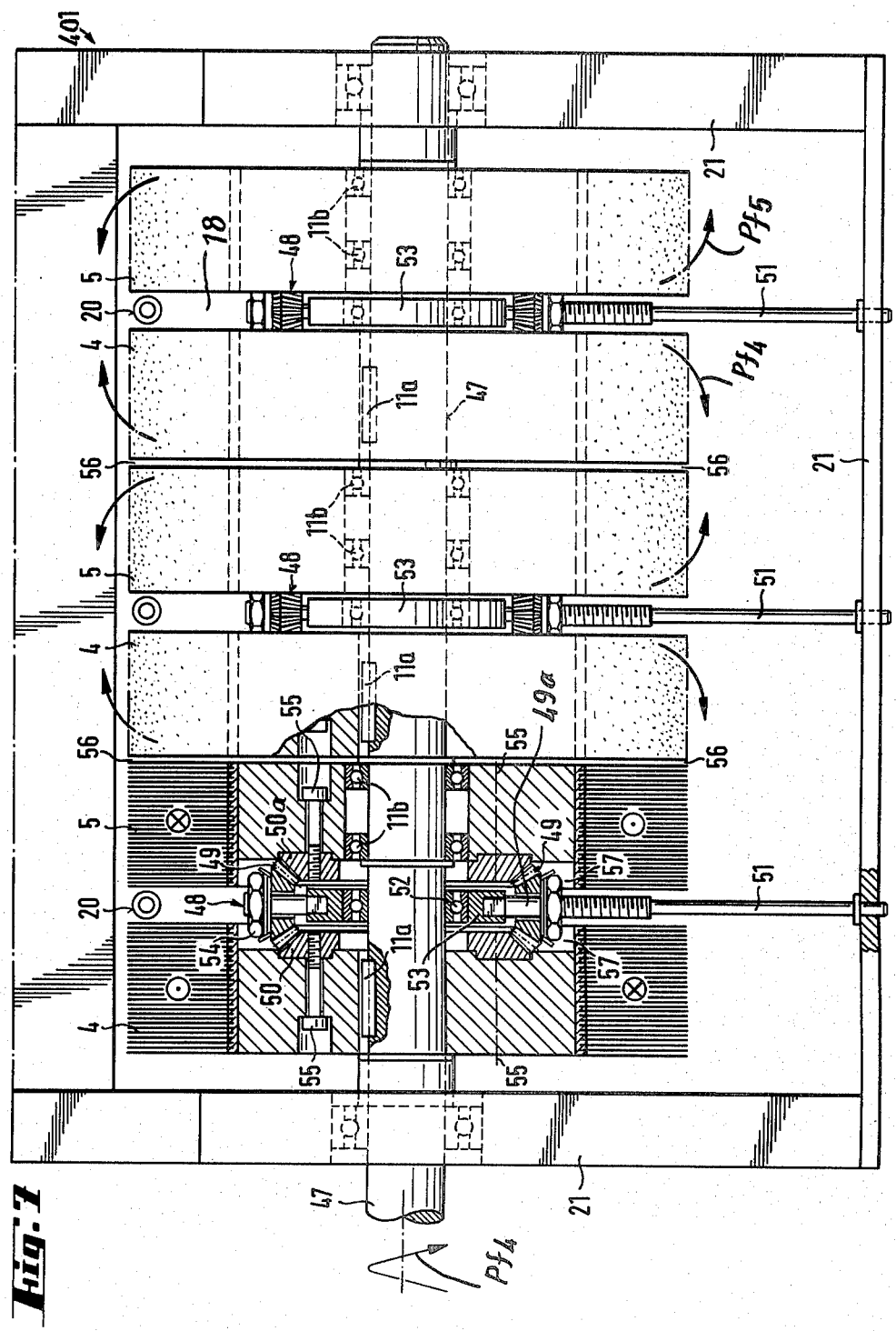

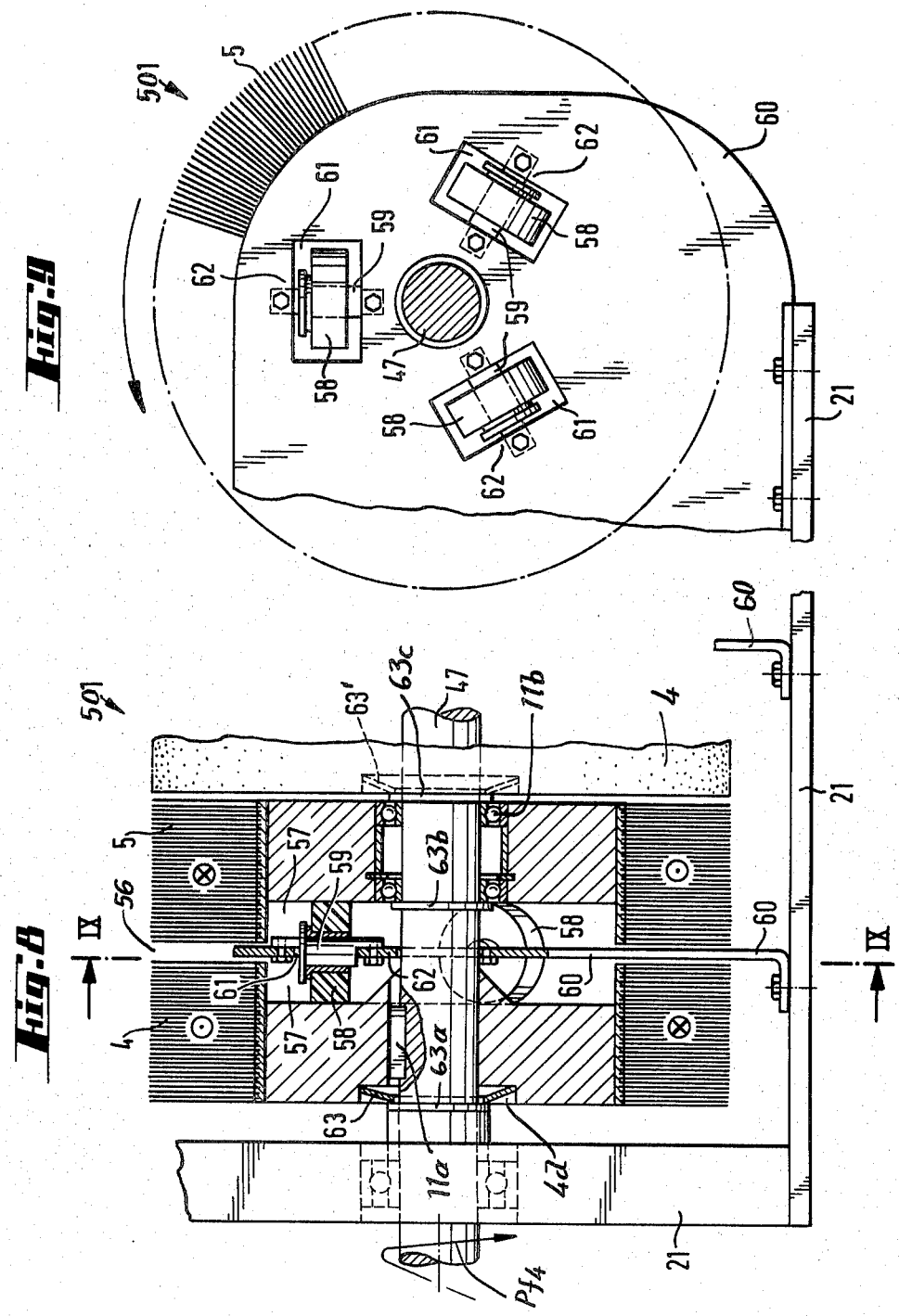

MACHINE FOR REMOVING BURRS FROM SHEET METAL OR THE LIKE

BACKGROUND OF THE INVENTION

The present invention relates to improvements in machines for removing projections or other irregularities, especially burrs, from marginal portions of plate- or sheet-like bodies consisting of a metallic or like material. More particularly, the invention relates to improvements in machines for removing burrs from flat metallic or like workpieces by means of rotating brushes, especially brushes whose bristles consist of or include wires or like metallic bodies. Still more particularly, the invention relates to improvements in deburring machines of the type wherein marginal portions of plate- or sheet-like workpieces are or can be treated by plural brushes which rotate in opposite directions.

British Pat. No. 1,488,974 discloses a deburring machine with several brushes which are caused to rotate in opposite directions and can remove burrs from a selected marginal portion of a plate- or sheet-like workpiece. The machine is designed for simultaneous treatment of two parallel marginal portions of a workpiece. To this end, the machine is provided with two rotating shafts which extend at right angles to the direction of travel of the workpiece and carry sleeve-like supports for bristles which treat the respective marginal portions of the workpiece. The bristles extend substantially at right angles to the direction of movement of the workpiece and each of the shafts is driven by a discrete prime mover.

U.S. Pat. No. 3,400,449 discloses a modified deburring machine which is designed to subject plate- or sheet-like workpieces to a preliminary treatment preparatory to welding, soldering or a like bonding operation. The machine employs brushes whose bristles treat the marginal portions of the workpiece and which are mounted on shafts extending in parallelism with the marginal portions of the workpiece. The brushes are cylindrical so that their bristles extend radially of the respective axes of rotation and the tips of the bristles are designed to remove burrs from the respective marginal portions of a workpiece. The neighboring brushes are disposed at different levels and are driven to rotate in opposite directions. Each brush receives motion from a discrete prime mover.

OBJECTS AND SUMMARY OF THE INVENTION

An object of the invention is to provide a novel and improved deburring machine which is constructed and assembled in such a way that the number of prime movers need not match the number of brushes and which can subject the marginal portions of plate- or sheet-like workpieces to a uniform material-removing or smoothing treatment.

Another object of the invention is to provide a machine of the above outlined character with novel and improved means for driving a plurality of brushes or analogous material-removing tools in predetermined directions.

A further object of the invention is to provide a deburring machine with novel and improved means for properly guiding, advancing and holding relatively wide, relatively narrow, relatively thick, relatively thin, relatively hard or relatively soft workpieces in such a way that the marginal portions which require treatment are invariably advanced along a predetermined path which is best suited to ensure predictable and reliable removal or smoothing of burrs and/or other irregularities or defects.

An additional object of the invention is to provide the deburring machine with novel and improved means for facilitating more pronounced treatment of one side than of the other side of a selected marginal portion of an advancing sheet- or plate-like workpiece, or uniform treatment of both sides of such marginal portion.

A further object of the invention is to provide the deburring machine with novel and improved means for automatically holding the workpiece against movement from its prescribed path in response to engagement of the workpiece by brushes or analogous material removing and/or displacing tools.

An additional object of the invention is to provide the above outlined machine with novel and improved means for converting the support of the machine for reception of wide or narrow workpieces.

Another object of the invention is to provide a deburring machine wherein the material removing tools are grouped in a novel and improved way so as to ensure predictable, rapid, thorough and uniform removal of surplus material from selected sides or from all sides of one or more marginal portions.

An ancillary object of the invention is to provide a compact, reliable and relatively inexpensive machine which can be used for deburring or analogous treatment of a wide variety of workpieces which may but need not necessarily resemble plates or sheets and which, in addition to burrs, can exhibit other irregularities necessitating removal, flattening, smoothing or an analogous treatment.

Another object of the invention is to provide the deburring machine with novel and improved means for selecting the position of a workpiece with reference to the material removing tools.

An additional object of the invention is to provide the machine with novel and improved means for rotating neighboring coaxial brushes in opposite directions.

A further object of the invention is to provide a deburring machine with novel and improved means for transmitting torque to selected rotary parts in a simple, material saving and energy saving manner.

Another object of the invention is to provide a deburring machine which can be designed for treatment of large batches of identical workpieces or for treatment of different workpieces in any desired sequence, and wherein the workpieces can be advanced by hand, partially by hand and partially by a suitable conveyor system or exclusively by one or more conveyors.

A further object of the invention is to provide the deburring machine with novel and improved means for rapidly changing the rate of material removal from selected portions of an advancing workpiece, either prior to introduction of the workpiece into the machine or while the treatment is in progress.

Another object of the present invention is to provide a deburring machine which is not likely to cause injury to operators, whose manipulation requires a minimum of skill, and which can be designed for automatic treatment of a long series of workpieces in a time-saving and energy-saving manner.

The invention is embodied in a machine for removing burrs or analogous defects from elongated marginal portions of sheet- or plate-like workpieces. The machine comprises a table or other suitable support means on or in which a workpiece is movable so that a marginal portion of such workpiece advances along a predetermined path (e.g., along a horizontal path), at least one set of substantially brush-like tools (preferably cylindrical brushes having substantially radially extending metallic bristles) rotatable about a common axis which is at least substantially parallel to the aforementioned path and including at least one pair of neighboring tools, and means for rotating the tools of such pair in opposite directions. The rotating means may comprise a prime mover for transmitting torque to one tool of the pair of coaxial tools and a transmission which can be driven by the prime mover and serves to transmit torque to the other tool of the aforementioned pair.

The deburring machine preferably comprises a common first shaft for the pair of tools and the rotating means may comprise prime mover means for rotating one tool of the pair as well as a second shaft (e.g., a countershaft or an intermediate shaft) and a transmission (such as a belt transmission, preferably a toothed belt transmission, or a gear transmission) which transmits torque from the second shaft to the other tool of the pair. The first shaft can be directly coupled to the one tool by a key or the like so that, when the first shaft rotates (e.g., in response to starting of a variable-speed electric motor), the one tool is set in motion in the direction of rotation of the first shaft. The other tool of the aforementioned pair is then rotatable on the common shaft, e.g, owing to interposition of one or more friction bearings or antifriction bearings, such as ball bearings or roller bearings. The second shaft can receive torque from the prime mover means which drives the first shaft or from a discrete second prime mover.

In accordance with one presently preferred embodiment of the invention, the first shaft is a hollow shaft and spacedly surrounds the countershaft. The first shaft is then formed with a window or another suitable opening for one or more components of the transmission which drives the other tool in response to rotation of the countershaft. Such other tool is freely rotatable on the hollow shaft. The two shafts are then driven by discrete prime movers, however, it is equally possible to provide a single prime mover and two transmissions one of which transmits torque from the single prime mover to the hollow shaft and the other of which transmits torque from the single prime mover to the countershaft in the hollow shaft. The transmission between the countershaft and the other tool on the hollow shaft may comprise a gear train including a first gear secured to and driven by the countershaft, a second gear rotatably mounted on the hollow shaft and meshing with the first gear, and an internal gear secured to the other tool and meshing with the second gear.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a partly end elevational and partly vertical sectional view of the third machine, the section being taken in the direction of arrows as seen from the line V—V of FIG. 4;

FIG. 6 is a fragmentary partially top plan and partially horizontal sectional view of a fourth deburring machine wherein the shafts which rotate the brush-like tools of a single set in opposite directions are installed one within the other;

FIG. 7 is a fragmentary partly top plan and partly horizontal sectional view of a fifth deburring machine wherein the brush-like tools which rotate in one direction transmit torque to brush-like tools which rotate in the opposite direction;

FIG. 8 is a view similar to that of FIG. 7 but showing a portion of a sixth machine wherein the brush-like tools which rotate in one direction transmit torque to the neighboring tools by way of groups of friction wheels;

FIG. 9 is a transverse vertical sectional view as seen in the direction of arrows from the line IX—IX of FIG. 8;

DESCRIPTION OF THE PREFERRED EMBODIMENTS

Figure 1:
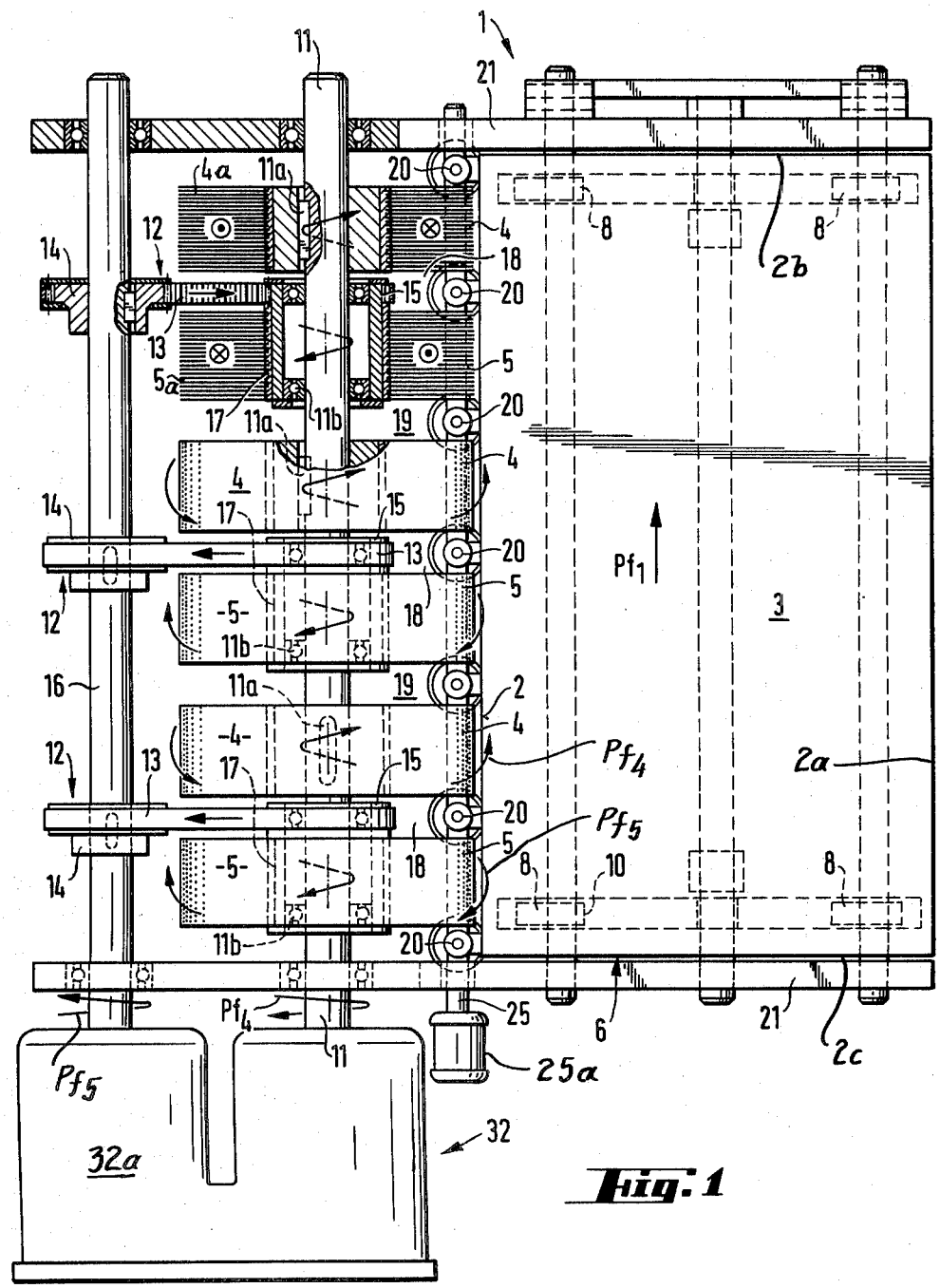
FIG. 1 is a partly top plan and partly horizontal sectional view of a deburring machine which embodies one form of the invention and comprises a single set of coaxial rotary brush-like tools forming three pairs of tools and wherein one tool of each pair rotates clockwise while the other tool of each pair rotates in a counterclockwise direction.

FIG. 1 illustrates a deburring machine 1 which comprises a stationary frame 21 for a table or support 6. The upper side of the table 6 supports a flat sheet- or plate-like workpiece 3 which is movable thereon in the direction of arrow Pf1 so that its straight elongated left-hand marginal portion 2 advances along a predetermined path and can be treated by the bristles 4a and 5a of six alternating cylindrical brush-like tools 4 and 5 (hereinafter called brushes). The bristles 4a and 5a preferably consist of or contain metallic wire. The arrangement is such that the brushes 4 rotate in a clockwise direction, as viewed by a person looking in the direction of the arrow Pf1 (see the arrows Pf4), so that their bristles 4a remove burrs and/or other irregularities or defects from and along the upper side of the marginal portion 2, and the brushes 5 rotate in a counterclockwise direction (see the arrows Pf5) so that their bristles 5a remove burrs and/or other irregularities or defects from and along the underside of the marginal portion 2. The six brushes 4 and 5 of the machine 1 rotate about a common horizontal axis which is defined by a driven shaft 11 and is at least substantially parallel to the marginal portion 2 of the workpiece 3. The three brushes 4 alternate with the three brushes 5 so that successive increments of the upper side and underside of the marginal portion 2 are repeatedly treated by the orbiting bristles 4a and 5a while the workpiece 3 advance in the direction which is indicated by the arrow Pf1. The workpiece 3 can be advanced by hand or by suitable drive means including an electric motor 25a. All of the brushes 4 and 5 are driven at a selected (constant or variable) speed which is preferably sufficiently high to ensure that the treatment of the marginal portion 2 can be completed during a single pass through the machine 1, especially if the workpiece is relatively thin. Of course, it is equally within the purview of the invention to subject the marginal portion 2 to a series of two or more successive treatments, depending on the desired degree of ultimate finish and on the nature, dimensions and material of irregularities or defects which are to be removed or corrected by the bristles 4a and 5a. Once the treatment of the marginal portion 2 is completed, the operator can decide to treat the other marginal portion 2a which may but need not be parallel with the marginal portion 2, to treat the marginal portion 2b which may but need not extend at right angles to the marginal portions 2 and 2a and/or to treat the marginal portion 2c which may but need not be parallel to the marginal portion 2b.

The arrows Pf4 indicate the direction of rotation of the shaft 11 and of the brushes 4 which receive torque directly from the shaft 11. The arrows Pf5 indicate the direction of rotation of the brushes 5 and of a countershaft 16 which is rotatably mounted in the frame 21 in parallelism with the shaft 11 and serves to transmit torque to the brushes 5. The tips of successive bristles 5a of the brushes 5 approach the advancing marginal portion 2 from below, and the tips of successive bristles 4a of the brushes 4 approach the marginal portion 2 from above when the machine 1 is in actual use and the workpiece 3 is properly advanced along the upper side of the table 6.

Figure 12:
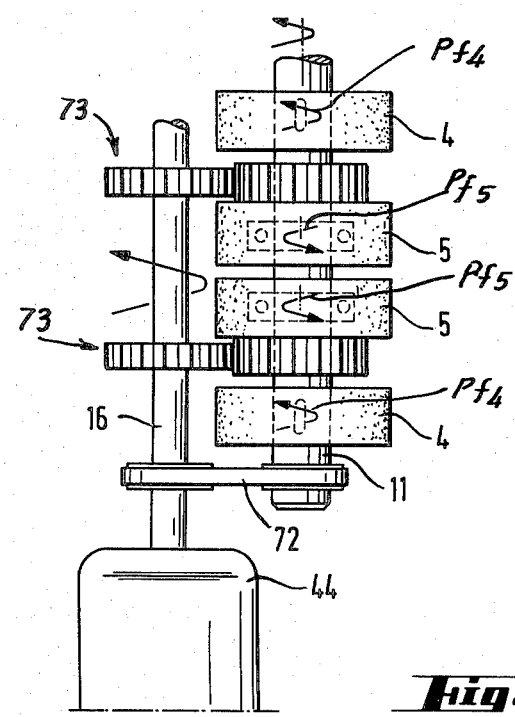
FIG. 12 is a fragmentary plan view of still another deburring machine wherein two brush-like tools which rotate in the same direction are coaxial with and adjacent to each other.

In each of the illustrated embodiments of the improved deburring machine, the brushes 4 and 5 are disposed in pairs of neighboring brushes which rotate in opposite directions but about common axes. However, whereas FIG. 1 shows that two of the three brushes 5 are disposed between pairs of neighboring brushes 4 and two of the three brushes 4 are disposed between pairs of neighboring brushes 5 (i.e., that the brushes 4 and 5 of the entire set of six coaxial brushes alternate regularly as considered from the one and all the way to the other axial end of the shaft 11), the pairs of neighboring brushes 4, 5 can also be mounted in a manner as shown in FIG. 12 wherein the two brushes 5 (which rotate in the same direction) are immediately adjacent to each other and are flanked by two brushes 4 which rotate in the opposite direction (this arrangement can be modified by placing the two brushes 4 between the two brushes 5 without departing from the spirit of the invention).

In accordance with a presently preferred embodiment of the invention, the machine 1 of FIG. 1 is constructed and assembled in such a way that the plane of the workpiece 3 on the table 6 (and more specifically the plane which is located midway between the upper side and the underside of this workpiece) also includes the axis of the shaft 11, i.e., that such plane includes an extension of a diameter of each of the six brushes 4 and 5. Such mounting of the table 6 ensures at least substantially identical treatment of both sides of the marginal portion 2. This can be readily seen in FIG. 3 which illustrates a deburring machine 101 with two sets of brushes 4, 5 including a first set at the left-hand side and a second set at the right-hand side of the sheet- or plate-like workpiece 3 on the table or support 6. The central horizontal symmetry plane of the workpiece 3 on the table 6 includes the axes of the two sets of brushes 4 and 5. However, FIG. 3 further shows that the table or support 6 can be adjusted by being raised and lowered (note the arrow 6a) and that it can be releasably held in a selected position (i.e., at any one of several levels) by bolts 6b or other suitable fastener means which secure the table 6 to the frame 21. Such adjustability of the table 6 is advisable in order to enhance the versatility of the machine 101, i.e., to enable the brushes 4 to effect a more pronounced treatment of the upper side of the adjacent marginal portion (e.g., the marginal portion 2 shown in FIG. 1) if the central symmetry plane of the workpiece 3 is lowered to a level below the level of the axis of the shaft 11, or to effect a more pronounced treatment of the underside of the marginal portion 2 if the aforediscussed central symmetry plane is raised to a level above that of the axis of the shaft 11. As a rule, or at least in most instances, it suffices to mount the table 6 on the frame 21 in such a way that the central symmetry plane of the workpiece 3 can be moved to a level below the level of the axis of the shaft 11, i.e., to one or more positions in which the treating action of the tips of bristles which rotate in the direction of arrows Pf4 is more pronounced than that of the tips of bristles 5a which rotate in the direction of the arrows Pf5. The positioning of the table 6 at a level at which the central symmetry plane of a workpiece 3 therein or thereon is located below the level of the axis of the shaft 11 is desirable and advantageous on the additional ground that the force with which the bristles 4a then tend to urge the underside of the workpiece 3 against the upper side of the table 6 exceeds the force with which the bristles 5a tend to lift the workpiece 3 off the table. This can be of importance if the workpiece 3 is advanced by hand, i.e., when the operator must exert the necessary force to invariably ensure that the underside of the advancing workpiece will remain in full surface-to-surface contact with the upper side of the table 6.

Figure 3:
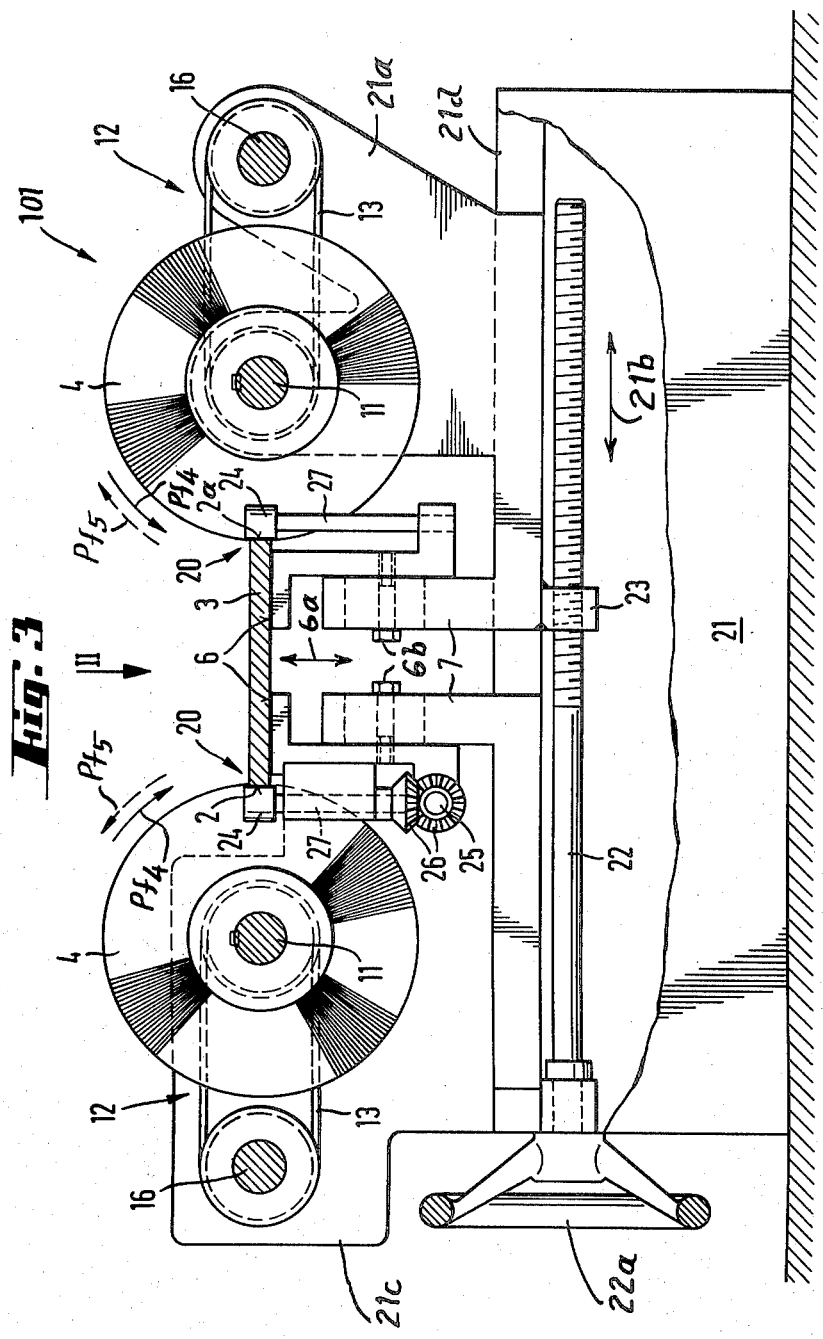
FIG. 3 is a partly front elevational and partly vertical sectional view of the second machine, the section being taken in the direction of arrows as seen from the line III—III of FIG. 2.

If the workpiece 3 is a stamping which is obtained by removing a portion of sheet-like material from a larger plate or the like in a punch press or an analogous machine, it is likely that its marginal portion or portions will extend at least slightly to one side of the respective major surface of the workpiece. If the machine 1 of FIG. 1 is to eliminate such irregularity by bending the marginal portion 2 back into the general plane of the workpiece and/or by removing at least some of the material which extends beyond one major surface of the workpiece, the table 6 is moved to a level below that which is shown in FIG. 3 and the workpiece 3 is placed onto the table 6 in such a way that its bent or similarly deformed marginal portion 2 extends upwardly and beyond the general plane of the upper side of the workpiece. The treatment which involves engagement of the marginal portion 2 by the bristles 4a then entails at least some reduction of the bend, i.e., the marginal portion 2 is either reduced in thickness or is bent back into the general plane of the major portion of the workpiece. In other words, by the simple expedient of properly selecting the level of the workpiece with reference to the common axis of the brushes 4 and 5, one can compensate for bending or deforming action of the tool which has formed the marginal portion 2 by making a cut in a larger blank consisting of sheet metal or the like.

In addition to being adjustable up and down, i.e., at right angles to the common axis of the brushes 4 and 5 shown in FIG. 1, the table or support 6 is preferably further adjustable in directions toward and away from the shaft 11. To this end, the table 6 can be mounted on a carriage 7 of the type shown in FIG. 5. The carriage 7 has a vertical slot 7a for a wiper 7b on a lever 7c which is pivotable in the frame 21 about a horizontal shaft 7d and can be fixed in any one of several angular positions by a pin 7e extending into a selected one of an arcuate row of holes 9 provided in the frame 21 as well as through a hole in the lower end portion of the lever 7c. If the lever 7c is pivoted in a counterclockwise direction, as viewed in FIG. 5, the wiper 7b moves upwardly and the carriage 7 is caused to move in a direction to the left i.e., nearer to the shafts 28 and 29 for the two sets of brushes 4 and 5 shown in FIG. 5. FIG. 5 further shows that the carriage 7 for the table 6 has two openings or windows 7f for discs 8 which are eccentrically mounted on stubs 8a at the upper ends of two levers 10. By rotating the stubs 8a, one can change the angular positions of the eccentric discs 8 and hence the level of the upper side of the table 6. Such construction can be used as a substitute for adjustable mounting of the type shown in FIG. 3 wherein the table 6 is held in a selected position by fasteners 6b. The levers 10 for the stubs 8a are articulately mounted in the frame 21 and can be held in selected positions by a pin 10a extending into one of an arcuate row of holes 9a in the frame 21. Adjustability of the levers 10 with reference to the frame 21 is not critical because the carriage 7 can be moved toward or away from the brushes 4 and 5 if the stubs 8a are rotatable about fixed axes. Such mounting of the stubs 8a still allows for upward or downward movement of the carriage 7 in response to changes in angular positions of the eccentric discs 8. The structure of FIG. 5 allows for simultaneous or sequential adjustment of the level of the upper side of the table 6 and of the distance between the table and the axes of the brushes 4 and 5. Such adjustments (especially the adjustment in directions toward and away from the brushes) are desirable and advantageous because the operator can select the length of those portions of the bristles 4a and 5a which are to engage and sweep along the respective sides of the adjacent marginal portion 2 of the workpiece 3 on the table 6. Moreover, adjustability of the table 6 in directions toward and away from the brushes 4, 5 renders it possible to optimally conform the machine 201 of FIG. 5 to the dimensions of the workpieces to be treated. For example, if the right-hand marginal portion 2a of the workpiece 3 shown in FIG. 1 is caused to slide along a stationary guide (not shown) of the frame 21, a wider workpiece can be treated in the machine 1 by the simple expedient of adjusting the distance between the table 6 and the shaft 11 for the brushes 4 and 5. Adjustability of the table 6 with reference to the brushes 4, 5 (namely, in directions toward and away from the brushes) is equally desirable (or perhaps even more desirable) in a machine 101 of the type shown in FIG. 3, namely, in a machine wherein two parallel marginal portions 2 and 2a of a workpiece 3 on the table 6 can be treated in a simultaneous operation because the machine 101 comprises two sets of brushes 4, 5 which flank the path for the workpiece 3 therebetween.

The path for the marginal portion 2 of a relatively thin workpiece 3 (e.g., a workpiece which consists of sheet metal) can be selected in such a way that the marginal portion 2 penetrates, to a certain extent, into the peripheral portions of the rotating brushes 4 and 5 on the shaft 11. This promotes the burr-removing action of the machine 1. Thus, the bristles 4a effect a pronounced treatment of the upper side and the bristles 5a effect a pronounced treatment of the underside of the advancing marginal portion 2 if the latter has been caused or allowed to penetrate to a certain extent into the outline or peripheral portion of each of the six coaxial brushes 4 and 5. At least in the majority of instances, a single pass of the marginal portion 2 through the machine 1 will suffice to complete the treatment of such marginal portion. The number of coaxial brushes on the shaft 11 can be selected practically at will and depends on the nature of workpieces to be treated, on the desired extent of material removal and on the availability of space for the machine in a machine factory or another plant wherein sheet- or plate-like workpieces must be treated prior to welding, soldering, riveting and/or other modes of processing. Since the brushes of each pair of neighboring brushes rotate in opposite directions, a workpiece 3 which is placed onto the table 6 can be achieved at a steady rate and the marginal portion 2 remains in its prescribed path even if the workpiece 3 (i.e., the marginal portion 2) is relatively short.

In accordance with a feature of the invention, the three brushes 4 and the three brushes 5 which form part of the machine 1 shown in FIG. 1 rotate in opposite directions but about a common axis, namely, about the axis of the shaft 11. The shaft 11 is driven by a prime mover 32 (e.g., a variable speed electric motor) which is mounted on or adjacent to the frame 21 so that the shaft 11 rotates in the direction indicated by the corresponding arrow Pf4. The cores of the brushes 4 are secured to the shaft 11 by torque transmitting means in the form of keys 11a so that each of these brushes is compelled to share all angular movements of the shaft 11. The brushes 5 have cores which are rotatable on antifriction bearings 11b (e.g., ball bearings) mounted on the shaft 11. The brushes 5 are driven by the countershaft 16 through the intermediary of belt, chain, gear or other suitable transmissions so that they rotate in directions indicated by the arrows Pf5. In the machine 1 of FIG. 1, the transmissions 12 which drive the brushes 5 in response to rotation of the countershaft 16 are belt transmissions each of which has an endless toothed belt 13, a first pulley 14 secured to the countershaft 16, and a second pulley 15 secured to a sleeve 17 which rotatably surrounds the corresponding portion of the shaft 11 and is connected with the core of the respective brush 5. The pulleys 15 may form integral parts of the respective sleeves 17, and each of these sleeves is rotatably mounted on two antifriction bearings 11b.

Since the pulleys 15 and the belts 13 take up a certain amount of space, the pairs of brushes 4, 5 which flank the corresponding pulleys 15 are separated from each other by relatively narrow clearances or gaps 18. Similar clearances or gaps 19 are or can be provided between those neighboring brushes 4 and 5 which do not flank a pulley 15. The clearances 19 are optional but advantageous because they allow for the installation of guide elements 20 for the adjacent marginal portion 2 of the workpiece 3, namely, for the marginal portion which is being treated by the bristles 4a and 5a. The guide elements 20 can be said to constitute stops which limit the extent of leftward movement of the workpiece 3, as viewed in FIG. 1. Such guide elements or stops are desirable because they ensure that the marginal portion 2 cannot penetrate too far into the arrays of bristles 4a and 5a when the machine 1 is in use. Excessive penetration of marginal portion 2 into the arrays of bristles 4a and 5a could lead to excessive wear upon and/or immediate damage to the bristles. The machine 1 comprises a total of seven stops 20, namely, five stops between the neighboring pairs of brushes 4, 5 (i.e., in the clearances 18 and 19) and two stops between the frame 21 and the two outermost brushes of the set.

The countershaft 16 is driven by a transmission 32a which receives torque from the output element of the prime mover 32. The exact construction of the transmission 32a (e.g., a transmission including a suitable gear train or an 8-belt with two pulleys) forms no part of the present invention.

Figure 2:
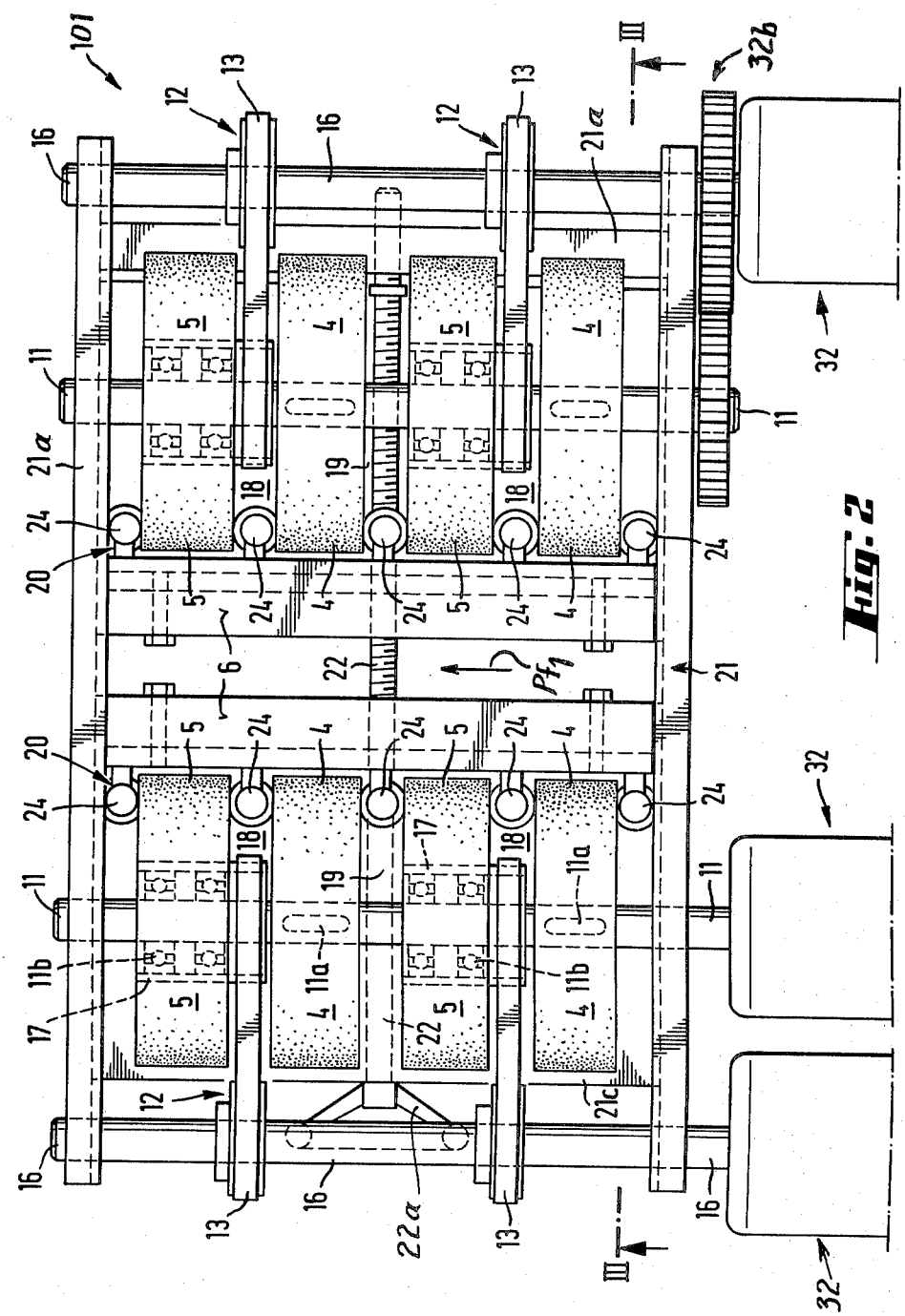
FIG. 2 is a fragmentary schematic plan view of a second deburring machine (see the arrow II in FIG. 3) with two sets of coaxial brush-like tools which is designed for simultaneous treatment of two parallel marginal portions of a sheet- or plate-like workpiece.

The deburring machine 101 of FIGS. 2 and 3 is designed to simultaneously treat two parallel or substantially parallel marginal portions 2 and 2a of a sheet- or plate-like workpiece 3 on the table or support 6. To this end, the machine frame 21 supports two parallel horizontal shafts 11 each of which carries four coaxial brushes including two brushes 4 which rotate in a direction (see the arrows Pf4 in FIG. 3) to treat the upper sides of the respective marginal portions 2 and 2a, and two brushes 5 which rotate in a direction (see the arrows Pf5 in FIG. 3) to treat the undersides of the respective marginal portions 2 and 2a of the workpiece 3 on the table 6. The left-hand shaft 11 of FIG. 3 is rotatable in a stationary portion 21c of the frame 21. The right-hand shaft 11 is mounted in a frame portion 21a which is movable back and forth in directions indicated by a double-headed arrow 21b. The means for moving the portion 21a with reference to the stationary portion 21c of the frame 21 comprises a horizontal feed screw 22 which is rotatably mounted in the stationary part of the frame 21 and meshes with a nut 23 which is rigid with the reciprocable portion 21a. The feed screw 22 can be rotated by a hand wheel 22a or by a motor, not shown. The reference character 21d denotes a portion of guide means for the movable or reciprocable portion 21a of the frame 21. The table 6 has two sections one of which is mounted on the frame portion 21c and the other of which is movable with the frame portion 21a.

The guide elements or stops 20 preferably comprise or constitute rotary members or rollers 24 in order to reduce friction between the stops and the marginal portions 2, 2a when the workpiece 3 is caused to advance in the direction of arrow Pf1. It suffices, at least in some instances, to rotate or positively drive one of the two groups of rollers 24. In the embodiment of FIGS. 2 and 3, the left-hand rollers 24 are secured to upright stub shafts 27 which are journalled in the stationary frame portion 21c and the lower end portions of which carry bevel gears 26 mating with complementary bevel gears 26 on a horizontal drive shaft 25 which is also mounted in the frame portion 21c and can be rotated by a small electric motor (see the aforementioned motor 25a shown in FIG. 1). The stubs 27 for the right-hand rollers 24 of FIGS. 2 and 3 are simply rotatable in the movable frame portion 21a; however, it is clear that these stubs can be driven by a separate motor so as to rotate clockwise, as viewed in FIG. 2 (the left-hand rollers 24 of FIG. 2 are driven to rotate in a counterclockwise direction, as viewed in FIG. 2, if the workpiece 3 is to be advanced in the direction of arrow Pf1). The motor 25a can constitute a means for advancing the workpiece 3 of FIG. 3 in a direction at right angles to the plane of FIG. 3. Alternatively, the means for advancing the workpiece 3 in the direction of arrow Pf1 can comprise a discrete transporting unit, e.g., one or more belt conveyors whose upper reaches engage the underside of the workpiece 3 on the table 6. If desired, the transporting means for the workpiece can comprise one or more endless belt or chain conveyors having outwardly extending entraining fingers which engage the rear edge face of the workpiece on the table 6 and push it in the direction of the arrow Pf1 through a preselected distance or until the drive for the conveyor or conveyors is arrested.

The manner in which the shafts 11 of FIGS. 2 and 3 cooperate with the associated countershafts 16 so that the brushes 4 are rotated in the directions indicated by arrows Pf4 whereas the brushes 5 rotate in the directions indicated by arrows Pf5 is analogous to that described in connection with FIG. 1. The left-hand countershaft 16 is mounted on the stationary frame portion 21c, and the right-hand countershaft 16 is mounted on the reciprocable frame portion 21a.

The machine 101 comprises three prime movers 32, i.e., the total number of prime movers is a small fraction of the total number of brushes 4 and 5. The right-hand prime mover 32 of FIG. 2 drives the right-hand countershaft 16. A gear transmission 32b drives the right-hand shaft 11 in response to rotation of the right-hand prime mover 32 and right-hand countershaft 16. The left-hand prime mover 32 of FIG. 2 drives the left-hand countershaft 16, and the third prime mover 32 of FIG. 2 drives the left-hand shaft 11. Each of the prime movers 32 may constitute a variable-speed electric motor. This renders it possible to drive the left-hand brushes 4 of FIG. 2 at a speed which is identical with or different from the speed of the left-hand brushes 5. Since the ratio of the illustrated transmission 32b is constant, the ratio of speeds of the right-hand brushes 4 and 5 is also constant. However, the transmission 32b can be replaced with a variable-speed transmission if it is desirable to drive the right-hand brushes 4 at a speed which deviates from the speed of the right-hand brushes 5.

Figure 4:
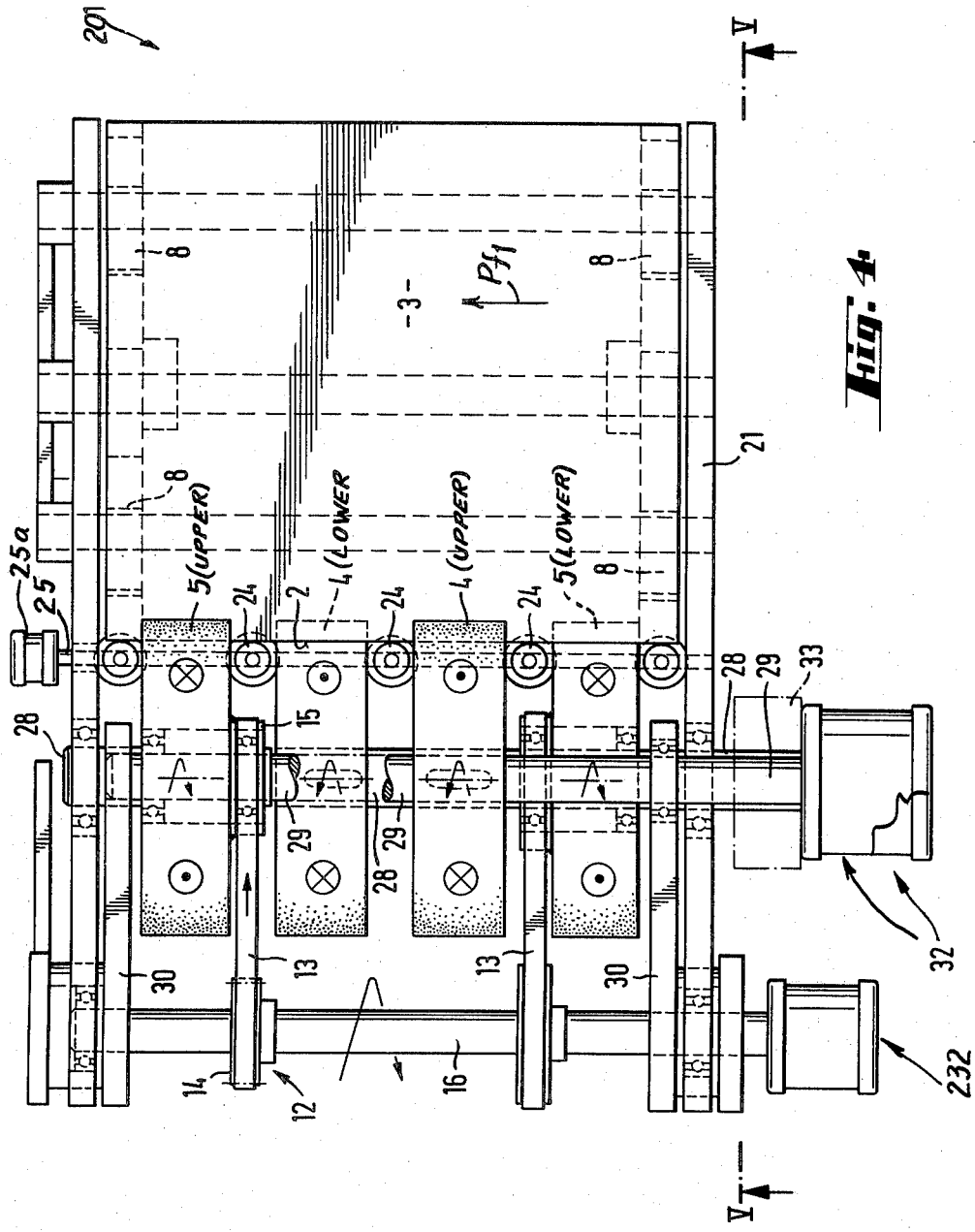
FIG. 4 is a schematic plan view of a third deburring macine (see the arrow IV in FIG. 5) wherein two sets of coaxial brush-like tools are located at one side of the path of movement of a workpiece.

The deburring machine 201 of FIGS. 4 and 5 differs from the machines 1 and 101 in that it comprises two sets of coaxial brushes 4, 5 at one side of the path for the workpiece 3. The first set of brushes 4, 5 is mounted on the common shaft 28 which is parallel to the path for the marginal portion 2 of the workpiece 3 on the table or support 6, and the second set of brushes 4, 5 is mounted on the second common shaft 29 which is located at a level above and is parallel with the shaft 28. The shafts 28 and 29 cooperate with a common countershaft 16. The lower brush 5 and the lower brush 4, as viewed in FIG. 4, are mounted on the lower shaft 28, and the other two brushes 4, 5 are mounted on the upper shaft 29. It will be noted that the brushes on the shafts 28 and 29 alternate witth each other, as considered in the longitudinal direction of the path for the marginal portion 2 of the workpiece 3 on the table 6. The bristles of neighboring brushes 4, 5 on the shafts 28 and 29 partially overlap each other (see FIG. 5), as considered in the direction of movement of the marginal portion 2. The axes of the shafts 28, 29 are preferably located in a common vertical plane, i.e., in a plane which is normal to the plane of the workpiece 3 on the table 6.

The lower shaft 28 is mounted directly in the frame 21, the same as the countershaft 16. The upper shaft 29 is mounted on several supporting links 30 which are turnable about the axis of the countershaft 16 so that the brushes 4, 5 on the shaft 29 are movable substantially transversely of the shaft 28. The angular positions of the supporting links 30 can be changed to thereby select the extent of overlap of brushes 4, 5 on the shaft 29 with the brushes 4, 5 on the shaft 28. Of course, such angular adjustment of the links 30 will entail some shifting of the axis of the upper shaft 29 from the vertical plane including the axis of the lower shaft 28. FIG. 5 shows that the marginal portion 2 of the workpiece 3 on the table 6 extends into what can be called a substantially wedge-like nip 31 between the tips of bristles of the upper brushes 4, 5 and the bristles of the lower brushes 4, 5. This ensures highly satisfactory guidance of the workpiece 3 during advancement in the direction of arrow Pf1. The levels of the shafts 28, 29 can be readily selected in such a way that the tip of each of the bristles 4a and 5a impinges at an optimum angle against the respective side of the marginal portion 2 when the machine 201 is in actual use. It has been found that the machine 201 is especially suited for the treatment of marginal portions of relatively thick and heavy sheet- or plate-like workpieces. When the shafts 28 and 29 are mounted in a manner as shown in FIG. 5, the tips of the bristles 4a and 5a which are about to impinge against the respective sides of the marginal portion 2 make an angle of approximately 45 degrees with the general plane of the workpiece 3, i.e., with a plane which includes the upper side or the underside of such workpiece or is located substantially midway between the two sides. Such orientation of the tips of bristles 4a, 5a immediately prior to movement into contact with the respective sides of the marginal portion 2 has been found to ensure a highly satisfactory deburring action.

The number of brushes on each of the shafts 28 and 29 can be increased to more than two, and the number of brushes on the shaft 28 need not match the number of brushes on the shaft 29. It has been found that the machine 201 operates highly satisfactorily if the number of brushes on the shaft 28 matches the number of brushes on the shaft 29. The provision of two sets of brushes for the treatment of one and the same marginal portion of a workpiece is desirable and advantageous because each of the two sides as well as the edge face of the marginal portion 2 can be treated by bristles 4a and 5a, i.e., the upper side of the marginal portion 2 shown in FIG. 5 will be treated by the bristles 5a of the brush 5 on the upper shaft 29 as well as (to a certain extent) by the bristles 4a of the brush 4 on the shaft 29. Analogously, the underside of the marginal portion 2 will be treated by both brushes 4, 5 on the lower shaft 28. All of the brushes can treat the edge face of the marginal portion 2. The just discussed mode of treating the marginal portion 2 ensures that the deburring operation does not entail the development of fresh burrs which would have to be removed in a separate operation or in a different machine. Fresh burrs would be likely to develop when the machine is used to remove highly pronounced burrs or other irregularities along a selected marginal portion of a plate- or sheet-like workpiece, e.g., a workpiece which has been obtained by stamping or punching so that one side of its marginal portion extends well beyond the respective major surface.

Another important advantage of the machine 201 is that the brushes 4, 5 on the two shafts 28, 29 define the aforementioned nip 31 into which the marginal portion 2 extends. The establishment of such nip ensures that the action and reaction forces which develop in the course of a deburring operation balance or neutralize each other, even if the irregularities at one side of the marginal portion 2 are more pronounced than those at the other side. Therefore, the workpiece 3 remains in full contact with the upper side of the table 6 even if the deburring operation involves removal of substantial quantities of material and the rate of removal is not constant, as considered in the longitudinal direction of the marginal portion 2, and/or at the opposite sides of such marginal portion.

The manner in which the shafts 28, 29 and 16 shown in FIGS. 4 and 5 are driven will be selected in dependency on a number of parameters, e.g., on the desired range of speeds of such shafts, on the resistance which the brushes must overcome in removing irregularities from the marginal portion 2 and/or others. In the machine 201, the two shafts 28, 29 are driven in the same direction (Pf4) by two discrete electric motors 32 or analogous prime movers. The countershaft 16 is driven by a third electric motor 232 or another suitable prime mover. The transmissions 12 between the countershaft 16 and the brushes 5 on the shafts 28 and 29 are preferably identical with the similarly referenced transmissions of the machine 1 shown in FIG. 1.

It is equally within the purview of the invention to employ additional links 30 for pivotable mounting of the lower shaft 28 in the frame 21 of the machine 201. Such arrangement is desirable and advantageous if it is necessary to invariably maintain the axes of the shafts 28, 29 in a common vertical plane. Thus, when the links 30 for the shaft 29 are pivoted clockwise or counterclockwise through a predetermined angle, the links for the shaft 28 are also pivoted (but counterclockwise or clockwise) through the same angle. It is equally possible to fixedly mount the shaft 29 in the frame 21 and to mount the shaft 28 on two or more links for movement along an arcuate path whose center of curvature is located on the axis of the countershaft 16.

If the designer of the machine 201 desires to avoid the use of three discrete prime movers for the shafts 16, 28 and 29, one of the motors 32 can be omitted and is then replaced by a suitable transmission which drives the shaft 28 or 29 in response to starting of the remaining motor 32. The transmission must be of the type which allows the shaft 29 to pivot about the axis of the countershaft 16 without interrupting the torque transmitting connection between the single motor 32 and the shaft 28 and/or 29. Such transmissions may include suitable gear trains, belt drives, chain drives, sets of friction wheels and/or others. A transmission is shown, very schematically, at 33 in FIG. 4. This transmission is to replace one of the motors 32, e.g., a discrete motor 32 for the upper shaft 29. By way of example, the transmission 33 may comprise one or more belts with crossing stretches, a reversing gearing or the like.

The decision to select a larger number of motors or a larger number of transmissions depends on the cost of motors and transmissions, on the number of shafts which carry brushes, on the number of brushes on the shafts or on a combination of such factors. For example, if the number of brushes is relatively small and the transmissions are less expensive than the motors, the number of motors will be reduced and the machine will employ a larger number of transmissions. If the machine is relatively long and each of its brush-bearing shafts supports a long series of brushes, it may be advisable to provide a discrete motor for each of the shafts because this renders it possible to greatly reduce the number of transmissions.

A single motor 32 suffices if the machine 201 is equipped with a transmission which drives one of the shafts 28, 29 and with a reversing transmission which drives the countershaft 16. Analogously, the machine 201 can use only the motor 232 if it is equipped with two transmissions (e.g., reversing gearings) which drive the shafts 28, 29 or with a reversing gearing (which receives motion from the motor 232 and drives the shaft 28 or 29) and a transmission which receives motion from the shaft 28 or 29 and drives the other of these shafts.

As stated above, the machine 201 is especially effective for removal of substantial quantities of material from a selected marginal portion of a workpiece. Therefore, such machine can be used with advantage to complete the treatment of relatively thick marginal portions in a single pass and/or to complete, in a single pass, the treatment of a workpiece which consists of a relatively hard material so that deburring of a marginal portion necessitates the utilization of a large number of brushes.

The motors 32 and 232 of FIG. 4 will be used to drive the brushes 4 and 5 at different speeds if one side of a marginal portion necessitates a more pronounced treatment than the other side. This will be the case if the marginal portion is bent to one side of the workpiece and the machine 201 is to eliminate or at least reduce the extent of such deformation. It is possible to use motors each of which can drive the respective shaft at two or more speeds or to utilize motors which can drive the respective shafts at any one of a practically unlimited number of different speeds. The speed of the brushes 4 and 5 will be selected in such a way that the brushes which are to remove larger quantities of material are driven at the higher speed.

FIG. 6 illustrates a portion of a deburring machine 301 wherein the brushes 4 and 5 are rotatable (in opposite directions) about a common axis but receive torque from two discrete coaxial shafts. To this end, the frame 21 supports a hollow shaft 34 which is keyed (at 34a) to the brushes 4 and a second shaft 35 which is installed in the interior of the hollow shaft 34 and rotates therein in several antifriction bearings 35'. The shaft 34 rotates in antifriction bearings 34' which are installed in the frame 21 of the machine 301. This shaft is an equivalent of the shaft 11, and the shaft 35 is an equivalent of the countershaft 16 shown in FIG. 1. The hollow shaft 34 has one or more openings or windows 36 for portions of planetary gear transmissions 37.

Each of the transmissions 37 comprises a set of gears including a first gear 38 which is non-rotatably secured to the countershaft 35 by a key 39. A second gear 40 is mounted on a shaft 41 which is parallel to the shafts 34, 35 and is secured to the hollow shaft 34 so that a portion of the second gear 40 extends through the respective opening 36, into the interior of the shaft 34, and into mesh with the associated gear 38. The gear 40 further meshes with an internal gear 42 which is rigidly connected with the corresponding brush 5 and forms part of a sleeve 42a mounted on antifriction bearings 43 surrounding the shaft 34. It will be seen that, when the countershaft 35 is driven, the brushes 5 rotate in the directions indicated by arrows Pf5, i.e., counter to the direction of rotation of the brushes 4 which are secured to the shaft 34 (see the arrows Pf4).

Figure 11:
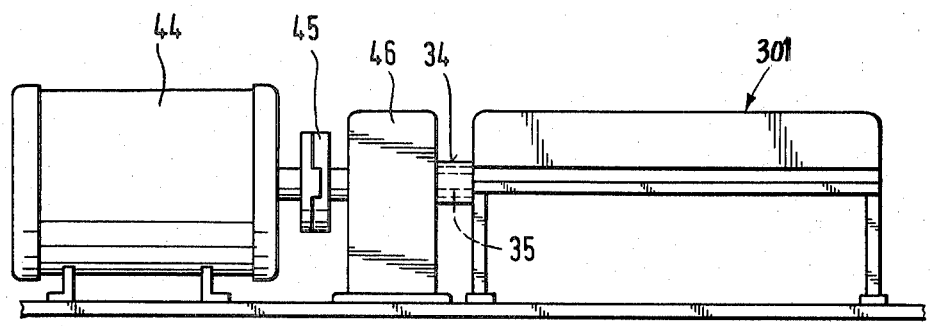
FIG. 11 is a smaller-scale side elevational view of the deburring machine which is shown in FIG. 6.

The shafts 34 and 35 are driven by discrete prime movers (not shown), e.g., by prime movers corresponding to the motors 32 and 232 shown in FIG. 4. Alternatively, and as shown in FIG. 11, the means for rotating the shafts 34 and 35 may comprise a single prime mover 44 (e.g., a variable-speed electric motor) which drives the shaft 34 or 35 by way of a clutch 45 and which further drives the input element of a transmission 46 serving to transmit torque to the shaft 35 or 34. If the transmission 46 is a variable-speed transmission, the speed of the shaft 34 can be varied independently of the shaft 35 or vice versa, i.e., the RPM of the brushes 4 can deviate from that of the brushes 5.

FIG. 7 illustrates a portion of a deburring machine 401 which need not utilize a countershaft to rotate the brushes 5 counter to the direction of rotation of the brushes 4. All of the brushes are mounted on a common shaft 47, and the brushes 4 are secured to this shaft by torque transmitting keys 11a so that they rotate with the shaft in the direction of arrow Pf4. Each brush 5 is rotatable on two antifriction bearings 11b which surround the shaft 47. Each brush 5 receives torque from the neighboring brush 4 through the medium of a bevel gear transmission 48 which is mounted in part on the frame 21 of the machine 401. Each transmission 48 comprises a set of at least three bevel gears including at least one first bevel gear 49 rotatably mounted on an adjustable member or extension 51 of the frame 21 and two annular bevel gears 50, 50a which mate with the bevel gear 49 and are respectively secured to the adjacent brushes 4 and 5. In order to enhance the transmission of power and to reduce the likelihood of or to prevent jamming of the components of each transmission 48, each of these transmissions preferably comprises several first bevel gears 49 (e.g., two bevel gears 49 which are disposed diametrically opposite each other). The lower bevel gear 49 shown in the left-hand portion of FIG. 7 is mounted directly on the corresponding extension or member 51 of the frame 21. The shaft 49a of the bevel gear carries a ring-shaped member 53 which is rotatable on an antifriction bearing 52 surrounding the shaft 47. The member 53 carries the other bevel gear 49. Such other bevel gear 49 of the leftmost intermediate gearing 48 shown in FIG. 7 is held against movement away from mesh with the adjacent annular bevel gears 50 and 50a by a nut 54 or an analogous securing device. The core of the leftmost brush 4 is secured to the annular bevel gear 50 by several screws or bolts 55, and similar bolts or screws 55 connect the annular bevel gear 50a to the core of the leftmost brush 5.

The number of relatively large clearances 18 in the machine 401 is substantially less than the number of brushes on the shaft 47 because the brushes 4, 5 of neighboring pairs of such brushes are rather closely adjacent to each other. Each of the clearances 18 accommodates a stop 20 in the form of a driven or idler roller which guides the selected marginal portion of a workpiece during treatment in the machine 401. The reference characters 56 denote minimal or very narrow gaps between those brushes 4 and 5 which do not flank any transmissions 48. The machine 401 employs three transmissions 48 and, therefore, the six brushes shown in FIG. 7 define three relatively wide clearances 18 for the corresponding extensions 51 and stops 20 as well as two narrower gaps 56. It is preferred to place the neighboring brushes as close to each other as possible, i.e., the width of the gaps 56 is preferably minimal and the width of the clearances 18 is preferably selected in such a way that they barely accommodate the respective transmission 48.

It will be seen that those sides or surfaces or end faces of the brushes 4 and 5 shown in FIG. 7 which flank the respective transmissions 48 are provided with coaxial or concentric recesses or chambers 57 for reception of the respective annular bevel gears 50, 50a as well as for reception of portions of the bevel gears 49. This contributes to a reduction of the width of clearances 18. Similar recesses or chambers 57 are provided in the brushes 4 and 5 of the machine 301 to accommodate portions of the respective gears 41 and 42 and to thus allow for the placing of all of the neighboring brushes 4, 5 into immediate proximity of each other. In the machine 301 of FIG. 6, the neighboring brushes 4, 5 are separated from each other exclusively by extremely or very narrow gaps corresponding to the gaps 56 shown in FIG. 7. The machine 301 of FIG. 6 need not be provided with any stops, or such stops may be provided ahead of the foremost brush and behind the rearmost brush. The frame 21 can define or comprise other means for adequately guiding a workpiece in the machine 301 so that the marginal portion which requires treatment will be properly guided along an elongated straight path in spite of the absence of stops 20 or analogous guide elements between neighboring brushes 4, 5.

An important advantage of the machine 301 is its compactness which is due to the fact that the countershaft 35 can be installed in the interior of the hollow shaft 34. Separate prime movers will be provided for the shafts 34 and 35 if each of these shafts must drive a substantial number of brushes, i.e., if the machine shown in the right-hand portion of FIG. 11 comprises a substantial number of brushes 4 which are driven by the shaft 34 and an equal number of brushes 5 which are driven by the shaft 35.

FIGS. 8 and 9 illustrate a portion of a deburring machine 501 which constitutes a modification of the machine 401 shown in FIG. 7. The transmissions between neighboring brushes 4 and 5 comprise friction wheels 58 which are at least partially recessed or accommodated in chambers 57 provided therefor in the corresponding end faces of the brushes. The holder means or shafts 59 for the friction wheels 58 are supported by the frame 21 through the intermediary of plate-like or strip-shaped supporting members or brackets 60. These brackets may consist of sheet metal and their outer portions are bolted, screwed or otherwise fastened to the frame 21. Each bracket 60 extends into the narrow gap 56 between two neighboring brushes 4, 5 and has three openings or windows 61 which are equidistant from each other, as considered in the circumferential direction of the cores of the neighboring brushes 4, 5, and surround the shaft 47. The brushes 4 are fixed to the shaft 47 by torque-transmitting keys 11a, and the cores of the brushes 5 rotate on antifriction bearings 11b which surround the shaft 47. Each bracket 60 supports three shafts 59 each of which extends across one of the windows 61 and supports a friction wheel 58 in such a way that the friction wheels bear against the adjacent surfaces of the brushes 4, 5 in the corresponding chambers 57. When the shaft 47 is driven by a suitable prime mover, not shown in FIGS. 8 and 9, it drives the brushes 4 whereby the brushes 4 rotate the adjacent sets of three friction wheels 58 which, in turn, rotate the adjacent brushes 5 counter to the direction of rotation of brushes 4. The shafts 59 for the friction wheels 58 are preferably fixed, i.e., they are preferably secured to the corresponding bracket 60, and the friction wheels 58 are free to rotate on the respective shafts 59. The number of friction wheels 58 for each of the brushes 5 can be reduced to less than three or increased to four or more. The axes about which the friction wheels 58 rotate extend radially of the shaft 47 and the distance between each of the friction wheels and the axis of the shaft 47 is preferably the same. The magnitude of forces which the transmissions employing the friction wheels 58 of FIGS. 8 and 9 can transmit depends on the bias of the cores of brushes 4, 5 against the respective friction wheels, the deformability of friction wheels and the distance between such friction wheels and the axis of the shaft 47.

It is desirable to provide means for biasing the cores of brushes 4 and 5 against the peripheral surfaces of the respective friction wheels 58. As shown in FIG. 8, the left-hand end face of the core of the leftmost brush 4 has an annular compartment 4d for a dished spring 63 which reacts against a split ring or collar 63a of the shaft 47 and bears against the brush 4 to urge the latter against the three friction wheels 58. The key 11a allows the brush 4 to move axially of the shaft 47. The bearings 11b for the brush 5 of FIG. 8 are held between two additional collars 63b, 63c and the right-hand collar 63c serves as a retainer for a second dished spring 63' which urges the right-hand brush 4 of FIG. 8 in a direction to the right, i.e., against the three friction wheels (not shown) which are disposed between such brush 4 and the brush 5 (not shown) located at the right-hand side thereof. The dished springs 63, 63' can be replaced by other types of springs, e.g, by coil springs, or any other suitable means which ensure that the brushes 4 are biased against the adjacent groups of friction wheels 58 to thereby bias such friction wheels against the corresponding brushes 5. The brackets 60 are at least slightly flexible to allow for some swaying of the groups of friction wheels 58 thereon in response to the bias of the corresponding dished springs.

The reference characters 62 denote those portions of the bracket 60 shown in the left-hand portion of FIG. 8 and of the bracket 60 shown in FIG. 9 which support the end portions of the respective shafts 59. The portions 62 are adjacent to the respective windows 61.

When the shaft 47 of FIGS. 8 and 9 is rotated in the direction of arrow Pf4, it immediately and directly drives the brushes 4 which are connected thereto by the corresponding keys 11a. The brushes 4 rotate the adjacent friction wheels 58 which, in turn, rotate the adjacent brushes 5 so that each brush 5 rotates counter to the direction indicated by arrow Pf4.

Figure 10:
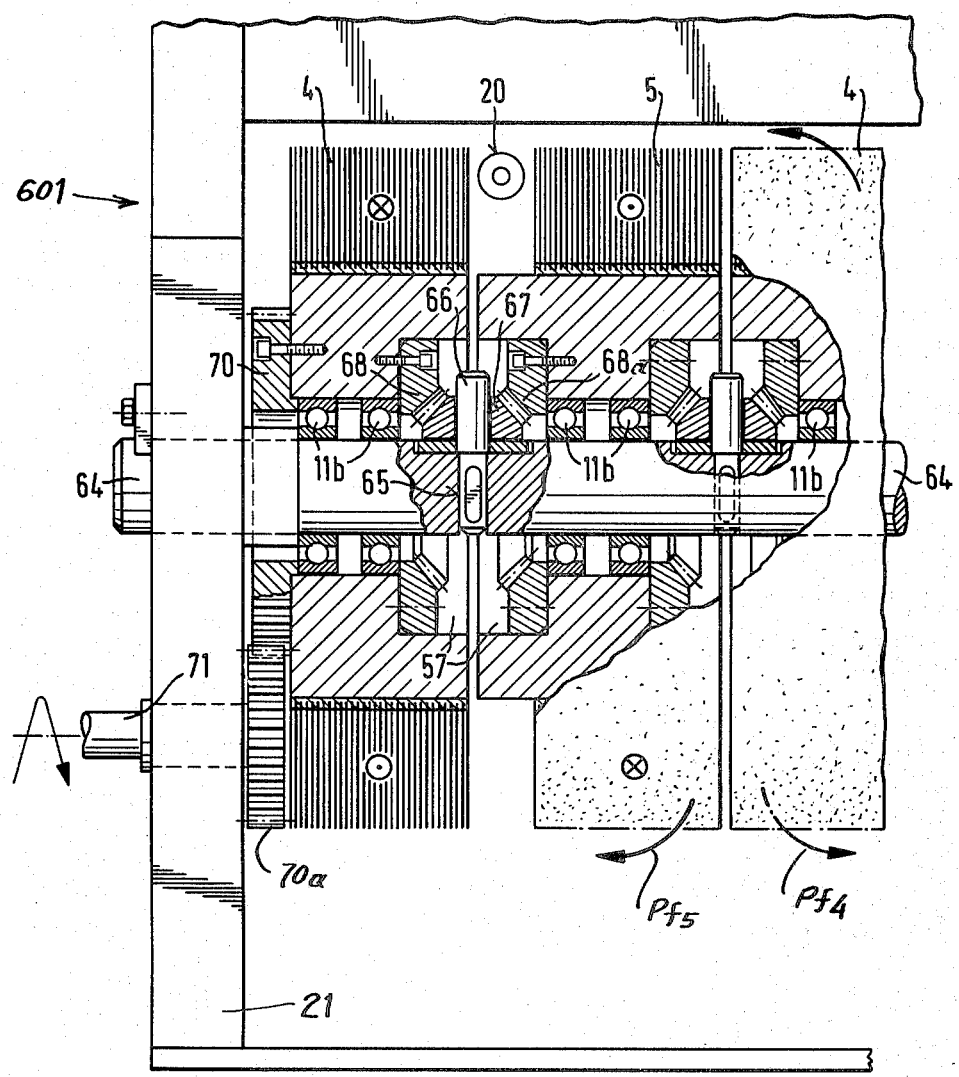
FIG. 10 is a view similar to that of FIG. 7 but showing a portion of a deburring machine which constitutes a further modification of the fifth machine.

FIG. 10 illustrates a portion of a deburring machine 601 which utilizes one or more bevel gear transmissions constituting modifications of the transmissions shown in FIGS. 7 and 8-9. An advantage of the machine 601 is that the extensions 51 (FIG. 7) and brackets 60 (FIGS. 8-9) can be dispensed with. The shaft 64 which defines a common axis for all of the brushes 4, 5 is fixedly mounted in the frame 21, i.e., this shaft need not be driven at all. The cores of all brushes 4 and 5 are rotatable on antifriction bearings 11b which surround the shaft 64. The arrangement is such that the leftmost brush 4 rotates the adjacent brush 5, that the just mentioned brush 5 rotates the brush 4 which is adjacent to the right-hand side thereof, and so forth, i.e., that successive brushes 4, 5 drive each other so that all of the brushes 4 rotate in a first direction (arrow Pf4) and all of the brushes 5 rotate in a second direction (arrow Pf5) counter to the first direction.

The shaft 64 has diametrically extending bores 65 for studs or posts 66 which constitute shafts for bevels gears 67. Each bevel gear 67 mates with two annular bevel gears 68, 68a which correspond to the bevel gears 50, 50a shown in FIG. 7. The bevel gears 68, 68a are recessed into chambers 57 in the adjacent end faces of cores of the respective brushes 4, 5 the same as shown in and described with reference to FIG. 7.

The means for rotating the leftmost brush 4 comprises a shaft 71 which can constitute the output element of a suitable prime mover, not shown, and drives a first gear 70a in mesh with a second gear 70 on the leftmost brush 4. The just described rotating means can be replaced by a prime mover having a hollow output element which surrounds the left-hand end portion of the fixed shaft 64 and is directly coupled to the leftmost brush 4.

The machine 601 of FIG. 10 can be modified in a number of ways without departing from the spirit of the invention. For example, the bevel gears 67, 68, 68a of each bevel gear transmission shown in FIG. 10 can be replaced by a transmission which employs several friction wheels of the type shown in FIGS. 8 and 9. The supporting means 59 of FIGS. 8 and 9 is then replaced with the studs or posts 66 which carry appropriate holders for the corresponding groups of friction wheels.

The bevel gears 67, 68, 68a of the transmissions shown in FIG. 10 can be replaced with spur gears without departing from the spirit of the invention. The spur gears which can replace the annular bevel gears 68, 68a are then so-called face gears each of which has an annulus of teeth disposed in a plane extending at right angles to the axis of the shaft 64. The same holds true for the bevel gear transmissions 48 of FIG. 7, i.e., each of these transmissions can comprise two or more pinions which replace the bevel gears 49 and two annular face gears which replace the annular bevel gears 50, 50a.

The machine 601 (the same as the machine 401) can also employ dished springs (note the springs 63, 63' in FIG. 8) or other suitable biasing means to ensure that the gears of the bevel gear or spur gear transmissions remain in constant mesh with each other.

In the deburring machine 701 of FIG. 12, the shaft 11 for the coaxial brushes 4 and 5 is driven by a belt or chain transmission 72 which is driven by the countershaft 16. The latter is driven by a prime mover 44 (e.g., a variable-speed electric motor). The transmissions 12 of FIG. 1 are replaced by transmissions in the form of gear trains 73. As already explained hereinbefore, the brushes 4 and 5 on the shaft 11 are distributed in such a way that the two brushes 5 (which rotate in the same direction as indicated by arrows Pf5) are adjacent to each other but the machine 701 still comprises several pairs of neighboring brushes 4, 5 which rotate in opposite directions. The arrows Pf4 indicate the direction of rotation of the shaft 11 with the brushes 4.

The improved machine is susceptible of many additional modifications. For example, the arrangement which is shown in FIG. 12 can be used in lieu of the arrangement shown in the right-hand portion of FIG. 3 or in lieu of the arrangement including the shaft 29 shown in FIG. 5. Other combinations of features which are embodied in the machines 1, 101, 201, 301, 401, 501, 601 and 701 are possible without departing from the spirit of the invention. As an additional example, the shaft 64 with its brushes 4, 5 can be used in FIG. 5 as a substitute for the lower shaft 28.

An important advantage of the improved deburring machine is that it can be readily designed or assembled to treat a single marginal portion or to treat two marginal portions in a simultaneous operation. Furthermore, the deburring operation can be regulated so that, at least in many instances, a single pass through the machine suffices to complete the treatment of a given marginal portion or of two marginal portions. A further important advantage of the improved machine is that there is no need to invert the workpiece, i.e., that a single transport through the machine suffices to complete the treatment of both sides as well as of the edge face of a single marginal portion or of two marginal portions. There is no need to provide a discrete prime mover for each of the brushes, i.e., the cost of the improved machine is relatively low. Still further, and since the brushes which are rotatable about a common axis include brushes which rotate clockwise as well as brushes which rotate counterclockwise, the brushes themselves can ensure that the workpiece continues to contact its support means during transport through the improved machine, i.e., that there is no need for exertion of a substantial effort in order to retain the workpiece in its path. This reduces the likelihood of injury to the attendants because the workpiece is not likely to fly away from the support when its selected marginal portion or marginal portions are engaged and treated by the bristles.

The position of the path for the marginal portion to be treated with reference to the axes of the brushes determines the width of those parts of such marginal portion which are contacted and thus treated by the tips of the bristles 4a and 5a. By properly selecting the path for a marginal portion, one can ensure that the bristles do not deface or otherwise adversely affect those portions of surfaces on a workpiece which do not require treatment by brushes or the treatment of which by brushes or the like would be detrimental to the appearance and/or other characteristics of the workpiece.

The machine of the present invention can be used with advantage in large plants for deburring of long series of workpieces. However, such machine will find just as many uses (or is perhaps even more suited for use) in relatively small plants wherein it is put to use to treat relatively short series of identical workpieces or a succession of different workpieces. The machine of FIGS. 4 and 5 can be used with particular advantage for the treatment of marginal portions of plate- or sheet-like workpieces which are obtained by repeated severing of a large supply of coiled sheet metal stock or the like. The same holds true for the machine of FIGS. 2 and 3; the features of this machine can be combined with those of the machine 201 shown in FIGS. 4–5 so that each of two parallel marginal portions of a sheet metal workpiece can be treated in a simultaneous operation by two sets of brushes, such as the two sets of brushes on the shafts 28 and 29 of the machine 201.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machine for removing defects from workpieces comprising:
   (a) a pair of tools for the removal of defects from a workpiece;
   (b) a common shaft for said tools defining a predetermined axis, said tools being mounted on said shaft and being rotatable about said axis; and
   (c) means for rotating said tools in opposite directions.

2. The machine of claim 1, wherein said rotating means comprises prime mover means for transmitting torque to one tool of said pair and a transmission arranged to drive the other tool of said pair.

3. The machine of claim 1, wherein each of said tools is a substantially cylindrical brush having metallic bristles.

4. The machine of claim 1, wherein said tools are cylindrical brushes having bristles extending substantially radially of said common axis and defining a narrow clearance therebetween.

5. The machine of claim 1, wherein said rotating means comprises means for driving the tools of said pair at different speeds.

6. The machine of claim 1, further comprising guide means for the workpiece, said guide means including a guide element disposed between the tools of said pair.

7. The machine of claim 1, comprising several pairs of neighboring brush-like tools.

8. The machine of claim 1, comprising support means on which the workpiece is movable so that a marginal portion thereof advances along a predetermined path substantially paralleling said axis.

9. The machine of claim 8, wherein said support means comprises a table arranged to support a workpiece in a position such that the general plane of a sheet- or plate-like workpiece includes said common axis.

10. The machine of claim 8, wherein said support means comprises a table arranged to support a workpiece in a position such that the general plane of a sheet- or plate-like workpiece is parallel to said common axis.

11. The machine of claim 8, further comprising a frame for said tools and said support means, and means for adjusting said support means with reference to said tools.

12. The machine of claim 1, wherein said rotating means comprises a single prime mover for rotating said tools.

13. The machine of claim 1, comprising another pair of rotatable tools for the removal of defects from the workpiece, and means for rotating the tools of said other pair, said other pair of tools being mounted on a single shaft which is spaced from said common shaft and defines another axis substantially paralleling said predetermined axis, and the tools of said other pair being rotatable about said other axis; and wherein the workpiece is movable in a predetermined plane and said axes define another plane which is at least approximately normal to said predetermined plane.

14. The machine of claim 13, wherein said tools are offset in a direction along said axes and the tools of said pairs overlap one another.

15. The machine of claim 13, wherein the distance between said shafts is adjustable.

16. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; a common first shaft for the tools of said pair; and means for rotating the tools of said pair in opposite directions, said rotating means comprising prime mover means for rotating one tool of said pair, a driven second shaft parallel to said first shaft, and transmission means interposed between said second shaft and the other tool of said pair.

17. The machine of claim 16, wherein said transmission means is a gear transmission.

18. The machine of claim 16, wherein said transmission means is a belt transmission.

19. The machine of claim 18, wherein said transmission has a toothed belt.

20. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; and means for rotating the tools of said pair in opposite directions, said rotating means comprising a shaft whose axis coincides with said common axis, means for driving said shaft in a first direction, means for transmitting torque from said shaft to one tool of said pair, means for rotatably mounting the other tool of said pair on said shaft, and means for rotating said other tool in a second direction counter to said first direction.

21. The machine of claim 20, wherein said torque transmitting means comprises a key.

22. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; and means for rotating the tools of said pair in opposite directions, said rotating means comprising a first shaft common to the tools of said pair, means for rotating said first shaft, means for transmitting torque from said shaft to one tool of said pair, a second shaft parallel to said first shaft, means for rotating said second shaft, and transmission means interposed between said second shaft and the other tool of said pair to rotate said other tool relative to said first shaft in response to rotation of said second shaft.

23. The machine of claim 22, wherein said second shaft is a countershaft and said means for rotating said second shaft receives motion from said means for rotating said first shaft.

24. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; and means for rotating the tools of said pair in opposite directions, said rotating means comprising a first shaft common to the tools of said pair, means for transmitting torque from said shaft to one tool of said pair, a countershaft parallel to said first shaft, prime mover means for rotating one of said shafts, first transmission means interposed between said shafts, and second transmission means for rotating the other tool of said pair in response to rotation of said second shaft, said other tool being rotatable with reference to said first shaft.

25. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; and means for rotating the tools of said pair in opposite directions, said rotating means comprising a hollow first shaft, means for transmitting torque from said first shaft to one tool of said pair, means for rotatably mounting the other tool of said pair on said shaft, a second shaft coaxial with, rotatable relative to and installed in the interior of said hollow first shaft, means for rotating said shafts, and transmission means for rotating said other tool in response to rotation of said second shaft.

26. The machine of claim 25, wherein said first shaft has an opening and said transmission means includes a portion extending through said opening.

27. The machine of claim 25, wherein said means for rotating said shafts comprises discrete prime mover means for said first shaft and said second shaft.

28. The machine of claim 25, wherein said first shaft has an opening and said transmission means comprises a first gear affixed to and driven by said second shaft in the interior of said first shaft, a second gear rotatably mounted on said first shaft and extending through said opening into mesh with said first gear, and an internal gear coaxially secured to said other tool and meshing with said second gear.

29. The machine of claim 28, wherein said second gear is rotatable about an axis which is parallel to the common axis of said shafts.

30. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; and means for rotating the tools of said pair in opposite directions, said rotating means comprising a first shaft whose axis coincides with said common axis, means for transmitting torque from said first shaft to one tool of said pair, means for rotatably mounting the other tool of said pair on said first shaft adjacent to said one tool, a countershaft parallel to said first shaft, transmission means arranged to transmit torque to said other tool in response to rotation of said countershaft, and means for driving said shafts, said driving means comprising a single prime mover.

31. The machine of claim 30, wherein said first shaft is hollow and said countershaft is installed in the interior of and is coaxial with said first shaft.

32. The machine of claim 30, wherein said prime mover is directly coupled to one of said shafts; and further comprising means for transmitting torque from said prime mover to the other of said shafts.

33. The machine of claim 30, wherein said driving means further comprises means for transmitting torque from said prime mover to one of said shafts and means for transmitting torque from said prime mover to the other of said shafts.

34. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; a frame for said support means and said tools; and means for rotating the tools of said pair in opposite directions, said rotating means comprising a shaft for the tools of said pair having an axis coinciding with said common axis, means for driving said shaft in a first direction, means for transmitting torque from said shaft to one tool of said pair, and transmission means mounted on said frame and isposed between the tools of said pair, said transmission means comprising means for rotating the other tool of said pair in a second direction counter to said first direction in response to rotation of said one tool.

35. The machine of claim 34, wherein said tools have adjacent surfaces and said means for rotating the other tool of said pair includes at least one friction wheel driven by said one tool and arranged to drive said other tool.

36. The machine of claim 35, further comprising supporting means for said friction wheel, said supporting means comprising a substantially plate-like member mounted on said frame, extending between the tools of said pair and having an opening, said friction wheel being mounted on said member and having a portion extending through said opening.

37. The machine of claim 35, wherein said means for rotating the other tool comprises a plurality of friction wheels rotatable about axes extending substantially radially of said shaft.

38. The machine of claim 37, wherein said friction wheels are equidistant from each other, as considered in the circumferential direction of said shaft, and are disposed at identical distances from said common axis.

39. The machine of claim 35, wherein at least one tool of said pair is movable axially of said shaft; and further comprising means for biasing said axially movable tool against said friction wheel so that the latter bears against the other tool of said pair.

40. The machine of claim 39, wherein said biasing means comprises at least one dished spring reacting against said shaft.

41. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; and means for rotating the tools of said pair in opposite directions, said rotating means comprising means for driving one tool of said pair in a first direction and transmission means interposed between the tools of said pair and arranged to rotate the other tool of said pair in a second direction counter to said first direction in response to rotation of said one tool.

42. The machine of claim 41, wherein said transmission means comprises at least one rotary friction wheel drive by said one tool and frictionally engaging said other tool.

43. The machine of claim 41, wherein said transmission means comprises a bevel gear transmission.

44. The machine of claim 43, wherein said bevel gear transmission comprises annular first and second bevel gears respectively provided on said one and said other tool and facing each other between the tools of said pair, and at least one third bevel gear mating with said annular gears.

45. The machine of claim 44, further comprising a frame for said support means and said set of tools, and means for supporting said third bevel gear, said supporting means being secured to said frame and extending between the tools of said pair.

46. The machine of claim 45, wherein said supporting means comprises an extension of said frame and a ring-shaped member mounted on said extension, said bevel gear transmission comprising a plurality of third bevel gears at least one of which is mounted on said ring-shaped member.

47. The machine of claim 46, wherein said means for driving said one tool comprises a common shaft for the tools of said pair, means for rotating said shaft; and means for transmitting torque from said shaft to said one tool; and further comprising means for rotatably mounting the other tool of said pair on said shaft.

48. The machine of claim 47, further comprising antifriction bearing means interposed between said shaft and said ring-shaped member.

49. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; and means for rotating the tools of said pair in opposite directions, said rotating means comprising drive means for rotating one tool of said pair, and transmission means for rotating the other tools of said pair, the tools of said pair having adjacent surfaces, and at least one of said surfaces having a recess, at least a portion of said transmission means being disposed in said recess.

50. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; means for rotating the tools of said pair in opposite directions; a second set of brush-like rotary tools rotatable about a second common axis which is adjacent to said path and is parallel to the first-mentioned common axis; and means for supporting at least one of said sets for movement with reference to the other of said sets substantially transversely of said common axes.

51. The machine of claim 50, wherein the tools of said second set comprises at least one second pair of neighboring tools; and further comprising means for rotating the tools of said second pair in opposite directions.

52. The machine of claim 50, wherein the tools of one of said sets partially overlap the tools of the other of said sets, as considered in parallelism with said common axes.

53. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; means for rotating the tools of said pair in opposite directions; and guide means for the marginal portion in said path, said guide means including a guide element disposed between the tools of said pair and comprising a rotary member.

54. The machine of claim 53, further comprising means for rotating the rotary member of said guide means so as to advance the marginal portion of the workpiece along said path.

55. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; a fixed shaft for the tools of said pair; means for rotatably mounting the tools of said pair on said fixed shaft; and means for rotating the tools of said pair in opposite directions, said rotating means comprising means for rotating one tool of said pair in a first direction, and transmission means for rotating the other tool of said pair in a second direction counter to said first direction in response to rotation of said one tool.

56. The machine of claim 55, wherein said transmission means comprises a first bevel gear supported by said fixed shaft and rotatable about a second axis extending substantially radially of said common axis, and two annular bevel gears respectively provided on said one tool and said other tool and mating with said first gear.

57. The machine of claim 56, wherein said fixed shaft comprises a substantially radially extending shaft for said first gear.

58. The machine of claim 55, wherein said transmission means comprises at least one friction wheel rotatably mounted on said fixed shaft and engaging both tools of said pair so that said one tool rotates said other tool in said second direction in response to rotation of said one tool in said first direction.

59. The machine of claim 55, wherein said means for rotating said one tool comprises a prime mover, and second transmission means interposed between said prime mover and said one tool.

60. A machine for removing burrs or analogous defects from elongated marginal portions of sheet- or plate-like workpieces, comprising support means on which a workpiece is movable so that a marginal portion thereof advances along a predetermined path, said support means having a substantially horizontal supporting surface for the workpiece; at least one set of brush-like rotary tools rotatable about a substantially horizontal common axis which is at least substantially parallel to said path and including at least one pair of neighboring tools; means for rotating the tools of said pair in opposite directions; a frame for said set of tools and said support means; and means for adjusting said support means with reference to said set of tools, said adjusting means including means for holding said support means at any one of a plurality of different levels.

61. A machine for removing burrs or analogous defects from elongated marginal portions of sheet- or plate-like workpieces, comprising support means on which a workpiece is movable so that a marginal portion thereof advances along a predetermined path; at least one set of brush-like rotary tools rotatable about a common axis which is at least substantially parallel to said path and including at least one pair of neighboring tools; means for rotating the tools of said pair in opposite directions; a frame for said set of tools and said support means; and means for adjusting said support means with reference to said set of tools, said adjusting means comprising means for moving said support means substantially transversely of said common axis.

62. A machine for simultaneously removing burrs or analogous defects from two substantially parallel, elongated marginal portions of sheet- or plate-like workpieces, comprising support means arranged to movably support a workpiece in such position that one marginal portion thereof can advance along a predetermined first path while another marginal portion thereof can advance along a predetermined second path parallel to said first path; at least one first set of brush-like rotary tools rotatable about a common first axis which is at least substantially parallel to said first path and including at least one first pair of neighboring tools; means for rotating the tools of said one pair in opposite directions; at least one second set of coaxial, brush-like rotary tools rotatable about a common second axis which is at least substantially parallel to said second path and including at least one second pair of neighboring tools; and means for rotating the tools of said second pair in opposite directions.

63. The machine of claim 62, further comprising a frame for said support means, said frame including a first portion supporting one of said sets and a second portion supporting the other of said sets and movable with reference to said first portion substantially at right angles to said common axes so as to vary the distance between said common axes, and means for moving said second portion with reference to said first portion.

64. The machine of claim 63, wherein said support means comprises a first section on said first portion and a second section on said second portion of said frame.

65. The machine of claim 63, wherein said moving means comprises a feed screw rotatably mounted in one of said portions and a nut mating with said feed screw and connected with the other of said portions.

* * * * *